(12) United States Patent
Kaltenbach et al.

(10) Patent No.: US 10,967,725 B2
(45) Date of Patent: Apr. 6, 2021

(54) MANUAL TRANSMISSION FOR A HYBRID DRIVE, METHOD FOR OPERATING A HYBRID DRIVE, AND HYBRID DRIVE

(71) Applicant: ZF Friedrichshafen AG, Friedrichshafen (DE)

(72) Inventors: Johannes Kaltenbach, Friedrichshafen (DE); Rayk Gersten, Friedrichshafen (DE); Stefan Renner, Bodman-Ludwigshafen (DE); Johannes Glückler, Friedrichshafen (DE); Christian Mittelberger, Ravensburg (DE); Kai Bornträger, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/485,551

(22) PCT Filed: Jan. 25, 2018

(86) PCT No.: PCT/EP2018/051845
§ 371 (c)(1),
(2) Date: Aug. 13, 2019

(87) PCT Pub. No.: WO2018/149609
PCT Pub. Date: Aug. 23, 2018

(65) Prior Publication Data
US 2019/0389298 A1 Dec. 26, 2019

(30) Foreign Application Priority Data

Feb. 14, 2017 (DE) .................. 10 2017 202 320.1

(51) Int. Cl.
*B60K 6/365* (2007.10)
*B60K 6/48* (2007.10)
(Continued)

(52) U.S. Cl.
CPC ............. *B60K 6/365* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS

| 8,408,084 B2 | 4/2013 | Gitt et al. |
| 8,684,875 B2 | 4/2014 | Kaltenbach et al. |

(Continued)

FOREIGN PATENT DOCUMENTS

| CN | 104 972 887 A | 10/2015 |
| DE | 10 2007 047 671 A1 | 4/2009 |

(Continued)

OTHER PUBLICATIONS

German Search Report Corresponding to 10 2017 202 320.1 dated Feb. 15, 2018.

(Continued)

*Primary Examiner* — Timothy Hannon
(74) *Attorney, Agent, or Firm* — Davis & Bujold PLLC; Michael J. Bujold (57) ABSTRACT

A transmission for a hybrid drive having transmission input and output shafts, a further transmission input shaft and an electric machine, which drives the further transmission input shaft. A main transmission has first and second partial transmissions with a plurality of gear planes and a pair of concentric fourth shafts, and shift elements. A range group can couple the main transmission and has a planetary gearset with three transmission elements. The first element can couple either of the transmission input shafts via the shift elements. The second element is connected to the transmission output shaft and can couple a gear plane of the partial (Continued)

transmissions via the shift elements. The third transmission element can be fixed to the housing or blocked against the first or second transmission element.

31 Claims, 2 Drawing Sheets (51) Int. Cl.
    *B60K 6/547*    (2007.10)
    *F16H 3/097*    (2006.01)
    *F16H 3/72*    (2006.01)
    *F16H 3/093*    (2006.01)

(52) U.S. Cl.
    CPC ...... *B60K 2006/4833* (2013.01); *F16H 3/097* (2013.01); *F16H 3/725* (2013.01); *F16H 2003/0933* (2013.01); *F16H 2200/0069* (2013.01); *F16H 2200/2048* (2013.01)

(56) References Cited

U.S. PATENT DOCUMENTS

| | | | | |
|---|---|---|---|---|
| 9,174,644 | B2 | 11/2015 | Sakata | |
| 9,915,327 | B2 | 3/2018 | Kaltenbach et al. | |
| 10,538,235 | B2* | 1/2020 | Kaltenbach | B60W 10/08 |
| 2009/0170649 | A1* | 7/2009 | Murakami | B60K 6/365 |
| | | | | 475/5 |
| 2010/0105517 | A1* | 4/2010 | Borntraeger | F16H 3/126 |
| | | | | 477/3 |
| 2011/0315462 | A1* | 12/2011 | Kaltenbach | F16H 37/046 |
| | | | | 180/65.27 |
| 2013/0109530 | A1* | 5/2013 | Kaltenbach | B60K 6/387 |
| | | | | 477/5 |
| 2013/0337961 | A1 | 12/2013 | Kaltenbach | |
| 2014/0150604 | A1* | 6/2014 | Kaltenbach | B60K 6/20 |
| | | | | 74/661 |
| 2014/0349810 | A1* | 11/2014 | Kaltenbach | B60W 20/00 |
| | | | | 477/5 |
| 2018/0319266 | A1* | 11/2018 | Kaltenbach | B60K 6/48 |

FOREIGN PATENT DOCUMENTS

| | | |
|---|---|---|
| DE | 10 2010 063 582 A1 | 6/2012 |
| DE | 10 2011 005 028 A1 | 9/2012 |
| DE | 10 2013 200 196 A1 | 7/2014 |
| DE | 11 2013 001 859 B4 | 10/2015 |
| DE | 10 2014 215 842 A1 | 2/2016 |

OTHER PUBLICATIONS

International Search Report Corresponding to PCT/EP2018/051845 dated May 4, 2018.
Written Opinion Corresponding to PCT/EP2018/051845 dated May 4, 2018.

\* cited by examiner

Fig. 1

| Gear | Pre-select | Closed shift elements ||||||| | | | | i | phi |
|---|---|---|---|---|---|---|---|---|---|---|---|---|---|---|
| | | 10 | 20 | 30 | 40 | 50 | 60 | 70 | L | S | I | J | | |
| 1 | 1 | X | | | | | X | | X | | | X | 10.60 | 1.30 |
| 2 | 1 | | | | X | | X | | X | | | X | 8.16 | |
| 2 | 4 | | | | X | X | | | X | | | X | 8.16 | 1.30 |
| 3 | 4 | | | X | | X | | | X | | | X | 6.27 | 1.30 |
| 4 | 4 | X | | | | X | | | X | | | X | 4.83 | 1.30 |
| 5 | 4 | | X | | | X | | | X | | | X | 3.71 | |
| 5 | 6 | | X | | | | | X | X | | | X | 3.71 | 1.30 |
| 6 | L | X | | | | | | X | X | | | X | 2.86 | |
| 6 | S | X | | | | | | X | | X | | X | 2.86 | 1.30 |
| 7 | 6 | | | | X | | | X | | X | | X | 2.20 | |
| 7 | 9 | | | | X | X | | | | X | | X | 2.20 | 1.30 |
| 8 | 9 | | | X | | X | | | | X | | X | 1.69 | 1.30 |
| 9 | 9 | X | | | | X | | | | X | | X | 1.30 | 1.30 |
| 10 | 9 | | X | | | X | | | | X | | X | 1.00 | |
| 10 | 10 | X | X | | | | | | | X | | X | 1.00 | |

Fig. 2

| Gear plane | | 1 | 2 | 3 | 4 | 5 | 6 | PS |
|---|---|---|---|---|---|---|---|---|
| Ratio | | -2.00 | -1.30 | -1.30 | -1.30 | -1.69 | -1.00 | -2.20 | -2.71 |

Fig. 3

| Gear | Pre-select | Closed shift elements ||||||| | | | | i | phi |
|---|---|---|---|---|---|---|---|---|---|---|---|---|---|---|
| | | 10 | 20 | 30 | 40 | 50 | 60 | 70 | L | S | I | J | | |
| 1 | 1 | X | | | | | X | | X | | X | | 10.60 | 1.30 |
| 2 | 1 | | | | X | | X | | X | | X | | 8.16 | |
| 2 | 4 | | | | X | X | | | X | | X | | 8.16 | 1.30 |
| 3 | 4 | | | X | | X | | | X | | X | | 6.27 | 1.30 |
| 4 | 4 | X | | | | X | | | X | | X | | 4.83 | 1.30 |
| 5 | 4 | | X | | | X | | | X | | X | | 3.71 | |
| 5 | 6 | | X | | | | | X | X | | X | | 3.71 | 1.30 |
| 6 | L | X | | | | | | X | X | | X | | 2.86 | |
| 6 | S | X | | | | | | X | | X | X | | 2.86 | 1.30 |
| 7 | 6 | | | | X | | | X | | X | X | | 2.20 | |
| 7 | 9 | | | | X | X | | | | X | X | | 2.20 | 1.30 |
| 8 | 9 | | | X | | X | | | | X | X | | 1.69 | 1.30 |
| 9 | 9 | X | | | | X | | | | X | X | | 1.30 | 1.30 |
| 10 | 9 | | X | | | X | | | | X | X | | 1.00 | |
| 10 | 10 | X | X | | | | | | | X | X | | 1.00 | |

Fig. 4

MANUAL TRANSMISSION FOR A HYBRID DRIVE, METHOD FOR OPERATING A HYBRID DRIVE, AND HYBRID DRIVE

This application is a National Stage completion of PCT/EP2018/051845 filed Jan. 25, 2018, which claims priority from German patent application serial no. 10 2017 202 320.1 filed Feb. 14, 2017.

FIELD OF THE INVENTION

The invention relates to a manual transmission for a hybrid drive, for instance a motor vehicle, having two transmission input shafts and an electric machine, which is drive-connected to one of the transmission inputs. The invention further relates to a method for operating a hybrid drive using such a manual transmission and a hybrid drive.

BACKGROUND OF THE INVENTION

Such a generic manual transmission is known from DE 10 2010 063 582 A1. The manual transmission is part of a hybrid drive having an internal combustion engine and an electric machine, which are both coupled to the manual transmission in a driving manner. For this purpose, the manual transmission has two transmission input shafts, one transmission input shaft of which is drive-connected to the internal combustion engine and the other transmission input shaft of which is connected to the electric machine. The manual transmission has a main transmission having two concentrically arranged countershafts, of which one countershaft is formed as a solid shaft and the other countershaft is formed as a hollow shaft and each forms part of a partial transmission of the main transmission. A plurality of gear planes coupled to the respective countershaft are assigned to every partial transmission. The gear planes include gearwheel sets, which can be selectively shifted by means of shift elements, such that different gear ratios between the transmission input shaft and the transmission output shaft and/or between the further transmission input shaft and the transmission output shaft can be achieved.

Such manual transmissions permit at least two separate drives, namely an electric machine drive and, for instance, an internal combustion engine drive, to act on a joint drive train, for instance of a motor vehicle. In this way, the drive train can be driven by a superposition of the drive torques of both drives or solely by the drive torque of one of the drives.

SUMMARY OF THE INVENTION

Based on this prior art, one embodiment of the invention addresses the problem of developing the scope of functions of a manual transmission of the type mentioned above. Furthermore, an optimized method for operating a hybrid drive having such a manual transmission is proposed. In addition, a hybrid drive is to be provided, which is suitable for the use of such a manual transmission and/or such a method.

The problem is solved by a manual transmission, a method and a hybrid drive having the features of the independent claims is proposed. Advantageous embodiments of the invention will become apparent from the dependent claims, the following description and figures.

According to one embodiment of the invention, a manual transmission, in particular an automated manual transmission, is provided for a hybrid drive, for instance in a motor vehicle, in particular in a commercial vehicle. The manual transmission has a transmission input shaft as a first shaft and a transmission output shaft as a second shaft. In particular, the transmission input shaft is intended to be drive-connected to a prime mover, such as an internal combustion engine.

The manual transmission furthermore has a further transmission input shaft as a third shaft and an electric machine, which is or can be drive-connected to the further transmission input shaft. The electric machine can form a unit in conjunction with the manual transmission, which is pre-installed, for instance at the factory. This results in assembly advantages, as, for instance, a pre-installed unit can be used in the final assembly of a motor vehicle. The electric machine, for instance, uses the housing of the manual transmission or a component attached to the housing with respect to the housing. The electric machine, for instance, is at least partially enclosed by the housing of the manual transmission and/or the component attached to the housing.

Furthermore, the manual transmission has a main transmission having at least two partial transmissions, in particular exactly two partial transmissions, of which a first partial transmission has at least one fourth shaft and at least one, preferably a plurality of gear planes coupled thereto and of which a second partial transmission has at least one further fourth shaft and at least one, preferably a plurality of gear planes coupled thereto. The fourth shaft and the further fourth shaft are arranged concentrically and/or coaxially with respect to each other. The fourth shaft, for instance, is a solid shaft and the further fourth shaft is a hollow shaft. The fourth shaft, for instance, is received in the further fourth shaft formed as a hollow shaft or the further fourth shaft encompasses the fourth shaft.

In particular, the main transmission is designed as a countershaft transmission. The fourth shaft and the further fourth shaft for instance, then form one countershaft each. Also, two fourth shafts and/or two further fourth shafts may be provided, which are each formed, for instance, as countershafts. In this case, a power split is achieved by means of the two fourth shafts and the two further fourth shafts.

In particular, the first partial transmission and the second partial transmission each have an input shaft and a joint output shaft. The input shaft of the first partial transmission is, for instance, operatively connected to the further transmission input shaft. The input shaft of the second partial transmission, for instance, is operatively connected to the transmission input shaft. The joint output shaft of the two partial transmissions is, for instance, operatively connected to the transmission output shaft.

Furthermore, the manual transmission has several shift elements, preferably assigned to the main transmission, the selective shifting of which shift elements results in different ratios between the transmission input shaft and the transmission output shaft and/or between the further transmission input shaft and the transmission output shaft. For instance, at least a number of the gear planes include gearsets, which can be selectively shifted by means of at least one or more or all of the shift elements such that different gear ratios between the transmission input shaft and the transmission output shaft and/or between the further transmission input shaft and the further transmission output shaft can be achieved. In particular, at least one of the shift elements can be used to shift the main transmission into a direct gear. In particular, the gear planes are bypassed in the direct gear.

In the manual transmission, a range group, which can be or is coupled to the main transmission and is in particular connected downstream of the main transmission, is now provided, which range group has at least one planetary gearset having a first transmission element, a second transmission element and a third transmission element. By means of at least one of the shift elements, the first gear element can be operatively connected to, in particular rotationally engaged with, the transmission input shaft and/or with the further transmission input shaft. Likewise, by means of at least one of the shift elements or another of the shift elements, the second gear element can be operatively connected to the transmission input shaft and/or to the further transmission input shaft, wherein the second gear element is additionally operatively connected to, in particular rotationally engaged with, the transmission output shaft. The third gear element can, by means of a shifting device, be selectively attached to a component attached to the housing or can be blocked against the first gear element or to the second gear element. As a result, the range group provides a first gear ratio when the third gear element is permanently retained, and the range group provides a second gear ratio when the third gear element is blocked, wherein the range group can be shifted between the first gear ratio and the second gear ratio by means of the gearshift device. The first gear element, for instance, is a sun gear, the second gear element is a planetary gear carrier, in particular a web, and the third gear element is a ring gear.

The range group results in an extension of the gears to be shifted. The gears of the main transmission can be assigned to a so-called slow gear group or a fast gear group depending on the state of the shifting device in the first gear ratio or second gear ratio. Basically, the gears of the main gear can be shifted twice in this way, such that the transmission has twice the number of gears, half of which are assigned to the slow group and the other half to the fast group. In this respect, the range group generates further functions for the manual transmission, which has now become a group transmission.

A component attached to the housing or the component attached to the housing is defined, for the purposes of the invention, in particular as a part of the housing of the manual transmission, which is formed for instance on the housing. A component attached to the housing can also be a separate component, which is connected to the housing of the manual transmission, for instance, detachably connected.

According to one embodiment of the invention, provision is made that the shifting device has at least one shift element as an additional shift element of the manual transmission, which can be brought into at least two shifting positions, wherein in one shifting position, the third gear element of the planetary gearset is permanently retained at the component attached to the housing and in a further shifting position, the third gear element of the planetary gearset is blocked against the first gear element or second gear element. As a result, the shifting device can be implemented in an economic manner and using a limited number of components as only one shift element has to be used.

According to an alternative embodiment of the invention, provision is made that the shifting device has at least two shift elements as additional shift elements of the manual transmission, of which a first additional shift element is used to retain the third gear element of the planetary gearset against the component attached to the housing and a second additional shift element is used to block the third gear element of the planetary gearset against the first gear element or second gear element. As a result, the shifting device can be implemented in a technically simple manner. Provision can also be made that the two additional shift elements are combined to a double shift element, for instance, each forming a single shift element of a double shift element. This measure also aims at implementing the shifting device in a technically simple manner.

It makes sense for the shifting device to have a neutral position, in particular an open position, in which the third gear element of the planetary gearset is decoupled from the component attached to the housing and is present without blocking. As a result, a gear bypassing the range group can be achieved in a technically simple manner, for instance, wherein by means of the at least one shift element, the second gear element is shifted in particular via the first partial transmission in operative connection with the further transmission input shaft and/or with the transmission input shaft and the shifting device is in the neutral position.

According to a further embodiment of the invention, provision is made that the main transmission has at least two drive constants, one drive constant of which is formed by a gear plane of the first partial transmission and the other drive constant is formed by a gear plane of the second partial transmission. The gear plane of at least one of the drive constants, for instance, has a fixed arrangement of their gear wheels, for instance by forming the gear wheels each as fixed gears, i.e. each rotationally engaged with the associated shaft. Alternatively, at least one of the drive constants can be shiftable. In this case, the associated gear plane has at least one idler gear as a gear wheel, which can be operatively connected to an associated shaft by means of a shift element.

A possible mechanical design of the manual transmission is providing a first gear plane, a second gear plane, a third gear plane, a fourth gear plane, a fifth gear plane and a sixth gear plane with respect to the main gear, of which the first gear plane, the fifth gear plane and the sixth gear plane are assigned to the first partial transmission and the second gear plane, the third gear plane and the fourth gear plane are assigned to the second partial transmission. The first gear plane and the second gear plane each form a drive constant. For this purpose, the first gear plane is operatively connected to, in particular rotationally engaged with, the further transmission input shaft and the second gear plane to the transmission input shaft.

The third gear plane, the fourth gear plane, the fifth gear plane and the sixth gear plane are formed as shiftable gear wheel planes and for that purposes each has at least one fixed gear and one, in particular directly or indirectly, for instance, with the interposition of at least one intermediate gear, assigned idler gear engaged with the former, wherein the fixed gear of the fifth gear plane and the sixth gear plane is assigned to the fourth shaft and the fixed gear of the third gear plane and the fourth gear plane is assigned to the further fourth shaft. Due to the six gear planes of the main transmission, in particular exact gear planes, the manual transmission can be implemented at relatively low construction cost, in particular if the gear planes are designed as spur gear planes and each has at least one spur gear stage.

The mechanical design of the manual transmission can also be designed such that the second gear plane, the third gear plane and the fourth gear plane are assigned to the transmission input shaft and the first gear plane, the fifth gear plane and the sixth gear plane are assigned to the further transmission input shaft. The transmission input shaft may be a solid shaft. The further transmission input shaft may be a hollow shaft. The further transmission input shaft, for instance, is arranged concentrically with respect to the transmission input shaft. The input shafts of the two partial transmissions, for instance, are coaxial to the joint output shaft of both partial transmissions. The joint output shaft of the partial transmission, for instance, is arranged coaxially to the transmission output shaft.

A possible interconnection of the components of the manual transmission can be implemented according to one embodiment of the invention such that the transmission input shaft can be operatively connected to, in particular rotationally engaged with, the first gear plane via a first shift element and to a fifth shaft via a second shift element. The fifth shaft, for instance, is operatively connected to, in particular rotationally engaged with, the first gear element of the planetary gear of the range group. Furthermore, provision is made that the third gear plane via a third shift element, the fourth gear plane via a fourth shift element and the fifth gear plane via a fifth shift element can each be operatively connected to, in particular rotationally engaged with, the fifth shaft and the sixth gear plane can be operatively connected to, in particular rotationally engaged with, the fifth shaft via a sixth shift element and via a seventh shift element to the second gear element of the planetary gearset of the range group. The direct gear of the main transmission, for instance, is achieved by closing the second shift element.

The further transmission input shaft, for instance, is operatively connected to, in particular rotationally engaged with, the input shaft of the first partial transmission, or formed by the input shaft of the first transmission. The transmission input shaft, for instance, is operatively connected to, in particular rotationally engaged with, the input shaft of the second partial transmission, or formed by the input shaft of the second partial transmission. The fifth shaft, for instance, is operatively connected to, in particular rotationally engaged with, the joint output shaft of the two partial transmissions or formed by the output shaft.

In a manual transmission, provision may be made that, with regard to the transmission input shaft or any internal combustion engine coupled thereto, at least one, for instance five, gear(s), in particular mechanical gear(s), can be selectively shifted by means of the main transmission. The selectively shiftable gears are implemented according to an embodiment of the invention in that in a $1^{st}$ gear, the first shift dement and the sixth shift element are closed, in a $2^{nd}$ gear, the fourth shift dement is closed, in a $3^{rd}$ gear the third shift dement is closed, in a $4^{th}$ gear the first shift element and the fifth shift dement are closed and/or in a fifth gear the second shift element is closed.

In the aforementioned gears, an assignment to the gear planes of the main gear is provided as follows: In 1st gear the sixth gear plane of the main transmission is used, in 2nd gear, the fourth gear plane of the main transmission is used, in $3^{rd}$ gear the third gear plane of the main transmission is used, in $4^{th}$ gear the fifth gear plane of the main transmission is used, wherein in $1^{st}$ gear and in $4^{th}$ gear the first gear plane is used as drive constant and in $2^{nd}$ gear and in $3^{rd}$ gear, the second gear plane is used as drive constant. The $4^{th}$ gear is the direct gear, in which the flow of power is not routed via any of the gear planes of the main gear, i.e. the fourth shaft and the further fourth shaft are bypassed.

In principle, a different assignment of the gears to the gear planes of the main transmission can be provided. For instance, the assignment between $3^{rd}$ gear and $4^{th}$ gear can be reversed. Then in $1^{st}$ gear, the sixth gear plane of the main transmission is used, in $2^{nd}$ gear the fourth gear plane of the main transmission is used, in $3^{rd}$ gear, the fifth gear plane of the main transmission is used and in $4^{th}$ gear the third gear plane of the main transmission is used, wherein the $5^{th}$ gear is the direct gear. The first gear plane and the second gear plane of the main gear are each used as a drive constant.

The range group results in an extension of the gears to be shifted. Basically, the gears of the main gear can be shifted twice, such that the transmission has twice the number of gears, half of which are assigned to the slow gear group and the other half to the fast gear group. The range group enables at least one, for instance ten, gears, to be selectively shiftable with respect to the transmission input shaft or any combustion engine coupled thereto.

The selectively shiftable gears are implemented according to an embodiment of the invention in that in a $1^{st}$ gear, the first shift element and the sixth shift element are closed and the third gear element of the planetary gearset of the range group is retained against the component attached to the housing by means of the shifting device, in a $2^{nd}$ gear, the fourth shift element is closed and the third gear element of the planetary gearset of the range group is retained against the component attached to the housing by means of the shifting device, in a $3^{rd}$ gear the third shift element is closed and the $3^{rd}$ gear element of the planetary gearset of the range group is retained against the component attached to the housing by means of the shifting device, in a $4^{th}$ gear, the first shift element and the fifth shift element are closed and the third gear element of the planetary gearset of the range group is retained against the component attached to the housing by means of the shifting device, in a $5^{th}$ gear, the second shift element is closed and the third gear element of the planetary gearset of the range group is retained against the component attached to the housing by means of the shifting device, in a $6^{th}$ gear, the first shift element and the seventh shift element are closed, in a $7^{th}$ gear, the fourth shift element is closed and the third gear element is blocked against the second gear element of the planetary gearset of the range group by means of the shifting device, in an $8^{th}$ gear, the third shift element is closed and the third gear element is blocked against the second gear element of the planetary gearset of the range group by means of the shifting device, in a $9^{th}$ gear, the first shift element and the fifth shift element are closed and the third gear element is blocked against the second gear element of the planetary gearset of the range group by means of the shifting device and/or in a $10^{th}$ gear, the second shift element is closed and the $3^{rd}$ gear element is blocked against the second gear element of the planetary gearset of the range group by means of the shifting device.

The $1^{st}$ gear, the $2^{nd}$ gear, the $3^{rd}$ gear, the $4^{th}$ gear, and the $5^{th}$ gear are assigned to the slow gear group. The shifting device is used to retain the third gear element of the planetary gearset of the range group against the component attached to the housing to provide a flow of power from the transmission input shaft to the transmission output shaft. The $6^{th}$ gear, the $7^{th}$ gear, the $8^{th}$ gear, the $9^{th}$ gear and the $10^{th}$ gear are assigned to the fast group. The range group is shifted, namely in $6^{th}$ gear the shifting device is in the neutral position and the seventh shift element is closed and in $7^{th}$ gear, $8^{th}$ gear, $9^{th}$ gear and $10^{th}$ gear, the shifting device is used to block the third gear element against the second gear element of the planetary gearset of the range group to provide a flow of power from the transmission input shaft to the transmission output shaft.

In the aforementioned ten gears, a flow of power is shifted, which starts at the transmission input shaft. However, a coupling of the torque of the electric machine into this flow of power is only implemented in individual cases. In order to provide the torque of the electric machine in other gears, it makes sense to additionally close the fifth shift element or the sixth shift element in $2^{nd}$ gear, to additionally close the fifth shift element in $3^{rd}$ gear, to additionally close the fifth shift element or the seventh shift element in $5^{th}$ gear, to additionally close the fifth shift element or the seventh shift element in $7^{th}$ gear, to additionally close the fifth shift element in $8^{th}$ gear, and/or to additionally close the first shift element or the fifth shift element in $10^{th}$ gear.

Furthermore, in $6^{th}$ gear additionally the third gear element of the planetary gearset of the range group can be retained against the component attached to the housing or be blocked against the second gear element of the planetary gearset of the range group by means of the shifting device. In $6^{th}$ gear the third gear element is load free both in the blocked case and in the retained case. The $6^{th}$ gear can therefore be used for shifting the range group between the first gear ratio and the second gear ratio or between the slow gear group and the fast gear group.

According to a further embodiment of the invention, a preliminary gear stage for the electric machine is provided. In this way, an electric machine having lower maximum torque and higher maximum speed can be used, which is economic.

According to a further embodiment of the invention, a further shifting device is provided, which can be used to selectively shift the preliminary gear stage into a superposition mode or a transmission mode. In superposition mode, the transmission input shaft and the further transmission input shaft act on the first partial transmission, in particular the input shaft of the first partial transmission, superposing rotational speeds. Thus in superposition mode, in addition to the operative connection of the electric machine to the input shaft of the first partial transmission, additionally an operative connection is established from the transmission input shaft to the input shaft of the first partial transmission, via which a prime mover connected to the transmission input shaft, such as an internal combustion engine, can act. In transmission mode, the further transmission input shaft acts on the first partial transmission, in particular on the input shaft of the first partial transmission, and the transmission input shaft is drive-decoupled from the preliminary gear stage. Thus, in the transmission mode of the preliminary gear stage an operative connection of the electric machine to the input shaft of the first partial transmission is established.

In the superposition mode, a so-called electrodynamic operation can be implemented by means of the electric machine. In this mode of operation, for instance, a motor vehicle can be driven away electrodynamically (electrodynamic driving away, EDA). In this mode of operation, shifting can be performed electrodynamically as well (electrodynamic shifting, EDS). In transmission mode, the electric machine is coupled to the first partial transmission, in particular the input shaft of the first partial transmission, in a fixed or constant ratio. The electric machine is used in a so-called IDS mode (Integrated Starter Generator, ISG).

According to one embodiment of the invention, provision is made that the further shifting device comprises at least one shift element as an additional shift element of the manual transmission, which can be brought in at least two shifting positions, wherein in one shifting position, the preliminary gear stage is shifted into superposition mode, in which the preliminary gear stage is operatively connected to the transmission input shaft, and in a further shifting position, the preliminary gear stage is shifted into transmission mode, in which the preliminary gear stage is drivingly decoupled from the transmission input shaft. As a result, the further shifting device can be implemented in an economic manner and using a limited number of components as only one shift element has to be used.

Alternatively, the further shifting device may comprise at least two shift elements as additional shift elements of the manual transmission, of which a third additional shift element is used to shift the preliminary gear stage into superposition mode and a fourth additional shift element is used to shift the preliminary gear stage into transmission mode. As a result, the further shifting device can be implemented in a technically simple manner. Provision can also be made that the two additional shift elements are combined to a double shift element, for instance, each forming a single shift element of a double shift element.

Furthermore, provision can be made that the further shifting device has a neutral position, in which the preliminary gear stage is brought out of superposition mode and out of transmission mode and the first partial transmission, in particular the input shaft of the first partial transmission, is drive-decoupled from the transmission input shaft and the electric machine.

In the embodiment having the provided further shifting device, it makes sense that the preliminary gear stage is formed by a planetary gear assembly having a first gear element, a second gear element and a third gear element. In that way, the preliminary gear stage can be implemented in a technically simple manner and compact design. The first gear element, for instance, is a sun gear, the second gear element is a planetary gear carrier, in particular a web, and the third gear element is a ring gear.

In this embodiment of the invention, a mechanical reverse gear with respect to the transmission input shaft or a drive, in particular an internal combustion engine, coupled thereto is implemented by the preliminary gear stage. Furthermore, the preliminary gear stage can be used to let a vehicle drive away in the reverse direction in EDA mode.

One possible mechanical design of the manual transmission is that with respect to the planetary gear assembly of the preliminary gear stage, the first gear element is operatively connected to, in particular rotationally engaged with, the further transmission input shaft and the second gear element is operatively connected to, in particular rotationally engaged with, a sixth shaft. For instance, the sixth shaft is operatively connected to, in particular rotationally engaged with, the first partial transmission, in particular the input shaft of the first partial transmission, or formed by the input shaft of the first partial transmission. Provision is further made that the third gear element can optionally be operatively connected to, in particular rotationally engaged with, the transmission input shaft or a component attached to the housing or the component attached to the housing by means of the further shifting device. For instance, the transmission input shaft or a prime mover or internal combustion engine drive-connected to the transmission input shaft is operatively connected to the ring gear, the electric machine is operatively connected to the sun gear and the input shaft of the first partial transmission is operatively connected to the planetary gear carrier of the planetary gear assembly.

The first shift element and/or the second shift element and/or the third shift element and/or the fourth shift element and/or the fifth shift element and/or the sixth shift element and/or the seventh shift element and/or the at least one shift element of the shifting device of the preliminary gear stage can be designed as (an) unsynchronized claw shift element(s). The fifth shift element and/or the sixth shift element and/or the seventh shift element and/or the at least one shift element of the shifting device of the preliminary gear stage can be actively used for a synchronization of the electric machine, in particular based on a speed control of the electric machine.

The first shift element and/or the second shift element and/or the third shift element and/or the fourth shift element can be used to synchronize to a drive, such as an internal combustion engine, coupled to the transmission input shaft. For this purpose, the manual transmission can also be shifted to EDS mode, in which a rotational speed superposition of the drive or of the internal combustion engine and of the electric machine at the preliminary gear stage is used for synchronization. The at least one shift element of the shifting device of the planetary gear of the range group, in particular the first additional shift element and/or the second additional shift element, may be designed as a synchronized or synchronizable shift element, for instance, as a frictional shift element.

Furthermore, the invention comprises a method for operating a hybrid drive of a motor vehicle, such as a commercial vehicle, using an internal combustion engine or any other drive and a manual transmission, in particular an automated manual transmission. The manual transmission may be the manual transmission described above. For the sake of clarity, the text below refers to the internal combustion engine throughout. However, the term internal combustion engine shall be understood to refer to any and all other relevant and/or suitable drives.

The transmission has a transmission input shaft as a first shaft, a transmission output shaft as a second shaft, a further transmission input shaft as a third shaft and an electric machine. The transmission input shaft is or can be drive connected to the internal combustion engine. The further transmission input shaft is drive connected to the electric machine. The transmission output shaft is or can be used to provide a tractive force to the motor vehicle.

The manual transmission further has a main transmission having at least two partial transmissions, one of which first partial transmissions has at least one fourth shaft and at least one, preferably a plurality of, gear plane(s) coupled thereto and the second of which partial transmissions has at least one further fourth shaft and at least one, preferably a plurality of, gear plane(s) coupled thereto, wherein the fourth shaft and the further fourth shaft are arranged concentrically and/or coaxially to each other. For instance, the first partial transmission and the second partial transmission each have an input shaft and a joint output shaft. The input shaft of the second partial transmission, for instance, is operatively connected to the transmission input shaft. The input shaft of the first partial transmission is, for instance, operatively connected to the further transmission input shaft. The joint output shaft of the two partial transmissions is, for instance, operatively connected to the transmission output shaft.

Furthermore, the manual transmission has several shift elements, preferably assigned to the main transmission, the selective shifting of which shift elements results in different ratios between the transmission input shaft and the transmission output shaft and/or between the further transmission input shaft and the transmission output shaft, wherein the at least one of the shift elements can be used to shift the main transmission into a direct gear. For instance, at least a number of the gear planes include gearsets, which are selectively shiftable by means of at least one or more or all of the shift elements such that different gear ratios between the transmission input shaft and the transmission output shaft and/or between the further transmission input shaft and the transmission output shaft can be achieved.

Furthermore, the manual transmission has a range group, which can be or is coupled to the main transmission and has at least one planetary gearset having a first transmission element, a second transmission element and a third transmission element. By means of at least one of the shift elements, the first transmission element can be operatively connected to, in particular rotationally engaged with, the transmission input shaft and/or with the further transmission input shaft. Likewise, by means of at least one of the shift elements or another of the shift elements, the second transmission element can be operatively connected to the transmission input shaft and/or to the further transmission input shaft, wherein the second transmission element is additionally operatively connected to, in particular rotationally engaged with, the transmission output shaft. The third gear element can, by means of a shifting device, be selectively attached to a component attached to the housing or can be blocked against the first gear element or against the second gear element, wherein the range group provides a first gear ratio when the third gear element is permanently retained, and the range group provides a second gear ratio when the third gear element is blocked, wherein the range group can be shifted between the first gear ratio and the second gear ratio by means of the gearshift device.

According to one embodiment of the method, the shifting of the range group between the first gear ratio and the second gear ratio is provided in a purely internal combustion engine operation or in a hybrid operation of the hybrid drive by shifting in a traction-force-controlled manner and/or a manner without interruption of the traction force and/or traction-force-maintaining manner. The purely internal combustion engine operation shall be defined in particular as the transmission output shaft being driven exclusively by the internal combustion engine. Hybrid operation shah be defined in particular as the transmission output shaft being driven by the internal combustion engine and the electric machine.

In order to achieve shifting of the range group in a traction-force-controlled manner and/or a manner without interruption of the traction force and/or traction-force-maintaining manner, provision is made that the transmission is shifted in the direct gear of the main transmission and into the first gear ratio of the range group and the electric machine is drive-shifted in the path of the flow of power of the direct gear, wherein the transmission input shaft and the further transmission input shaft are operatively connected to the first gear element of the range group in direct gear and then the steps are performed in the order listed below:

1. separate the electric machine from the operative connection to the first gear element of the range group by means of at least one of the shift elements;
2. operatively connect the electric machine to the second transmission element of the range group via the first partial transmission by means of at least one of the shift elements;
3. separate the transmission input shaft from the operative connection to the first gear element of the range group by means of at least one of the shift elements;
4. shift the range group into the second gear ratio by means of the shifting device.

As a result, in a purely internal combustion engine operation or in a hybrid operation of the hybrid drive, shifting the range group from first gear to second gear and thus shifting the manual transmission from the slow gear group to the fast gear group is achieved without the tractive force at the transmission output shaft being interrupted. The tractive force is supported by the electric machine during the shifting process, in particular during decoupling the internal combustion engine from the path of the flow of power, and is therefore retained. The first gear element and the second gear element of the planetary gear of the range group are used for this purpose. The first transmission element, for instance, is a sun gear, the second transmission element is a planetary gear carrier, in particular a web, and the third transmission element is a ring gear.

By shifting the range group when the transmission input shaft is still decoupled from the range group, the inertial mass acting on the range group is reduced at least by the inertial mass of the transmission input shaft. In this way, any losses during the shifting operation are reduced. For instance, then only the output shaft of the partial transmission is coupled to the first transmission element, in particular the sun gear.

For shifting the range group, it is recommended that the shifting device use at least one synchronized shift element, by means of which a synchronization is performed before the range group is shifted from the first gear ratio to the second gear ratio. As a result, an active synchronization by means of the internal combustion engine can be avoided. In this way, it is possible to avoid situations in which an active synchronization by means of the internal combustion engine is performed insufficiently, for instance, if the speed of the internal combustion engine cannot be lowered to the required extent.

The shifting of the range group can also be performed after the transmission input shaft has been operatively reconnected to the range group, for instance, after the shift from the direct gear to another gear has been completed. According to one embodiment of the method, provision may be made that after disconnecting the transmission input shaft in accordance with step 3 and before shifting the range group in accordance with step 4, the step described below is performed:

3a. Operatively connect the transmission input shaft to the second transmission element of the range group via the first partial transmission by means of at least one of the shift elements of the input shaft of the first partial transmission.

In principle, the method can also be used to achieve a shifting of the range group from the second gear ratio to the first gear ratio in a traction-force-controlled manner and/or a manner without interruption of the traction force and/or traction-force-maintaining manner. The steps described above can be performed in the same way, except that at the beginning of the process the range group is in the fast gear group or in the second gear ratio and then shifted to the slow gear group or the first gear ratio in accordance with step 4.

It makes sense to operate the electric machine and/or the internal combustion engine prior to disconnecting the operative connection between the electric machine and the first transmission element by means of the at least one shift element (step 1) such that the operative connection between the electric machine and the first gear element is load-free at the at least one shift element. As a result, in hybrid mode, a load reduction with respect to the electric machine, that is, in the path of the flow of power of the electric machine, occurs because the internal combustion engine takes over the load, rendering the operative connection at the at least one shift element load-free.

It also makes sense to perform a synchronization of the at least one shift element against the rotational speed of the second gear element by means of the electric machine after disconnecting the operative connection of the electric machine in accordance with step 1 and prior to the operative connection of the at least one shift element (step 2). In particular, the speed of the electric machine should be lowered to that end. For instance, synchronization can be actively performed by the speed control of the electric machine. Due to the performed synchronization, the conditions for the driving connection of the electric machine to the second gear element are established in a simple manner, without the at least one shift element requiring a synchronized or synchronizable shift element.

It further makes sense to operate the electric machine and/or the internal combustion engine after the operative connection of the electric machine in accordance with step 2 and prior to disconnecting the operative connection between the transmission input shaft and the first transmission element by means of the at least one shift element (step 3) such that the operative connection between the transmission input shaft and the first gear element is load-free at the at least one shift element. As a result, a transition of the load from the internal combustion engine to the electric machine occurs, i.e. now the electric machine supports the tractive force.

It also makes sense to perform a synchronization of the at least one shift element against the rotational speed of the input shaft of the first partial transmission by means of the internal combustion engine after disconnecting the transmission input shaft in accordance with step 3 and prior to the operative connection of the transmission input shaft to the second transmission element by means of the at least one shift element (step 3a). Due to the synchronization performed, the conditions for the driving connection of the internal combustion engine to the second gear element are established in a simple manner, without the at least one shift element requiring a synchronized or synchronizable shift element.

The synchronization of the at least one shift element by means of the internal combustion engine can be performed immediately after the transmission input shaft has been disconnected in accordance with step 3. In this way, a rapid shifting of the range group can be achieved.

The method described above can be performed in an embodiment or design of the manual transmission, in which the further transmission input shaft is directly operatively connected to, in particular rotationally engaged with, the input shaft of the partial transmission or formed thereof, or is operatively connected via a preliminary gear stage, in particular a fixed preliminary gear stage. The preliminary gear stage therefore results in a permanent transmission mode, in which the further transmission input shaft acts on the first partial transmission, in particular on the input shaft of the first partial transmission, and the transmission input shaft is drive-decoupled from the preliminary gear stage.

If such a preliminary gear stage is provided, it can be a shiftable preliminary gear stage, which can be brought from the transmission mode (ISG mode) into a superposition mode (EDA mode) by means of a further shifting device of the manual transmission, i.e., it can optionally be shifted into superposition mode or transmission mode. Unlike in transmission mode, in superposition mode the transmission input shaft and the further transmission input shaft act on the first partial transmission, in particular the input shaft of the first partial transmission, in terms of rotational speed.

The steps 1 to 4 of the method described above can also be performed in the embodiment or design of the manual transmission having the shiftable preliminary gear stage when the preliminary gear stage is shifted into superposition mode. Step 3a of the method described above may also be performed in the superposition mode of the manual transmission.

Even in the superposition mode of the preliminary gear stage, provision may be made to operate the electric machine and/or the internal combustion engine prior to disconnecting the operative connection between the electric machine and the first transmission element by means of the at least one shift element (step 1) such that the operative connection between the electric machine and the first gear element is load-free at the at least one shift element.

Provision may also be made to perform a synchronization of the at least one shift element against the rotational speed of the second gear element by means of the electric machine after disconnecting the operative connection in accordance with step 1 and prior to the operative connection of the electric machine to the second transmission element by means of the at least one shift element (step 2). In particular, the speed of the input shaft of the first partial transmission should be lowered to that end. This can be done by lowering the speed of the electric machine, for instance by means of speed control and/or by a reverse rotation of the electric machine. Due to the performed synchronization, the conditions for the driving connection of the electric machine to the second transmission element are established in a simple manner, without the at least one shift element requiring a synchronized or synchronizable shift element. This also renders the synchronization process relatively fast in time.

Alternatively, provision can be made that the preliminary gear stage is shifted from superposition mode to transmission mode after the active connection has been disconnected in accordance with step 1 and before the electric machine is connected to the second transmission element by means of the at least one shift element (step 2), subsequently a synchronization of the at least one shift element is performed against the rotational speed of the second gear element by means of the electric machine and then the preliminary gear stage is shifted back from the gear ratio operation into superposition mode. As a result, relatively few inertial masses rest on the preliminary gear stage, at least the transmission input shaft is decoupled from the preliminary gear stage and thus does not rest on the preliminary gear stage as inertial mass. This counteracts a dynamic momentum generated by inertial mass. A negative effect on driving comfort can be avoided.

Provision may also be made in superposition mode of the preliminary gear stage to set the electric machine and/or the internal combustion engine each, after the operative connection of the electric machine in accordance with step 2 and prior to disconnecting the operative connection between the transmission input shaft and the first transmission element by means of the at least one shift element (step 3), to such a torque value that the stationary gear ratio is present at a planetary gear assembly forming the preliminary gear stage, and thus the operative connection between the transmission input shaft and the first gear element is load-free at the at least one shift element. As a result, the one shift element can be rendered load-free in superposition mode of the preliminary gear stage in a simple way. In particular, the set torques have to be set to values within the technical limits of the electric machine and the internal combustion engine such that they match the setpoint desired by the driver or the driving strategy function as closely as possible.

Furthermore, provision can be made in superposition mode of the preliminary gear stage that a synchronization of the at least one shift element against the rotational speed of the input shaft of the first partial transmission is performed after disconnecting the transmission input shaft in accordance with step 3 and prior to the operative connection of the transmission input shaft to the second transmission element by means of the at least one shift element (step 3a), by setting the torque of the electric machine and the torque of the internal combustion engine to such a value that the speed of the internal combustion engine is at a target value for synchronization. As a result, the speed of the internal combustion engine is reduced to the target value in a simple manner by synchronizing the shift element.

Furthermore, the invention comprises a hybrid drive for a motor vehicle, in particular commercial vehicle, such as long-distance trucks, having an internal combustion engine and the transmission described above, the transmission input shaft of which is or can be drive connected to the internal combustion engine, in particular for performing the method described above.

The invention provides a manual transmission, in particular an automated manual transmission, which can be shifted under load and can be designed as a 10-speed transmission. A conventional drive-away clutch can be dispensed with. The manual transmission permits electrical traction support. Furthermore, the transmission permits traction support in hybrid operation in all provided gears. The manual transmission has a high efficiency and can be implemented at low construction costs. Furthermore, gear ratios are provided by means of the manual transmission, which has a suitable gear increment and a suitable difference between gear ratios for use in heavy-goods trucks. The manual transmission provides an electrodynamic drive-away function (EDA mode) in hybrid mode for forward drive mode and also for reverse mode. The manual transmission also provides an electrodynamic load shifting function (EDS mode) in hybrid operation.

Furthermore, the invention provides a method for operating a hybrid drive using the manual transmission, wherein the range group of the manual transmission is shifted between the low-speed gear group and the fast gear group with traction support. This traction-supported shifting can be performed both in a purely internal combustion engine mode and in a hybrid mode of the hybrid drive.

Further advantages, objectives, features and possible applications of the present invention will become apparent from the description of an exemplary embodiment with reference to the drawing below. All described and/or illustrated features as such or in any meaningful combination form the subject matter of the present invention, also independent of their summary in the claims or their retroactive application.

DETAILED DESCRIPTION OF THE PREFERRED EMBODIMENTS

Figure 1:
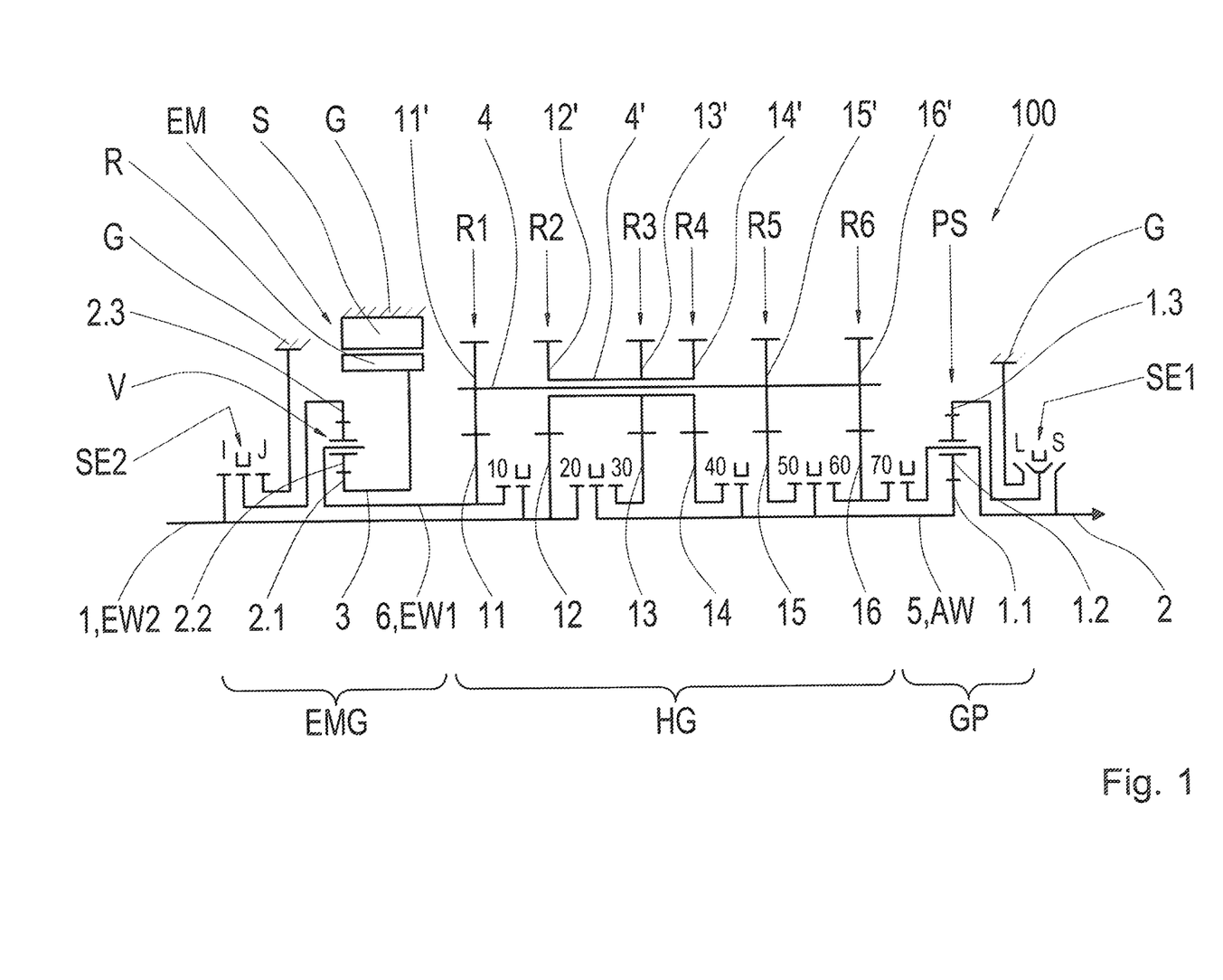
FIG. 1 shows a schematic representation of a possible embodiment of a manual transmission for a hybrid drive having a main gear, a range group and an electric drive.

FIG. 1 shows a possible embodiment of a manual transmission 100, in particular an automated manual transmission, which can be used, for instance, in or at a drive train of a motor vehicle, in particular a commercial vehicle. The manual transmission 100 has a transmission input shaft 1 as a first shaft, a transmission output shaft 2 as a second shaft, a further transmission input shaft 3 as a third shaft and an electric drive with an electric machine EM, which is or can be drive-connected to the further transmission input shaft 3. The electric machine EM, for instance, has a stator S attached to the housing and a rotor R, which can be rotated relative to the stator S and which is rotationally engaged with the further transmission input shaft 3. The manual transmission 100, for instance, is a component of a hybrid drive having a prime mover (not shown in FIG. 1), such as an internal combustion engine, which is or can be drive-connected to the transmission input shaft 1 of the manual transmission 100.

The manual transmission 100 has a main transmission HG having a plurality of gear planes, which preferably have a first gear plane R1, a second gear plane R2, a third gear plane R3, a fourth gear plane R4, a fifth gear plane R5 and a sixth gear plane R6, of which at least some of the gear planes R1, R2, R3, R4, R5 and R6 are or can be coupled to a fourth shaft 4 and at least other individual gear planes of the gear planes R1, R2, R3, R4, R5 and R6 are or can be coupled to a further fourth shaft 4'. The fourth shaft 4 and the further fourth shaft 4' are arranged concentrically with respect to each other. The fourth shaft 4 is preferably a solid shaft and the further fourth shaft 4' a hollow shaft. The fourth shaft 4 is preferably inserted into the further fourth shaft 4'. Preferably, the main transmission HG is designed as a countershaft transmission, wherein the fourth shaft 4 and the further fourth shaft 4' each form a countershaft. In principle, the main transmission HG can also have at least two fourth shafts 4 and at least two further fourth shafts 4'.

The main transmission HG comprises two partial transmissions, which can be interconnected, of which a first partial transmission comprises the first gear plane R1, the fifth gear plane R5 and the sixth gear plane R6, and a second partial transmission comprises the second gear plane R2, the third gear plane R3 and the fourth gear plane R4. The first partial transmission and the second partial transmission each have an input shaft EW1, EW2 and a joint output shaft AW. Preferably, the input shaft EW1 of the first partial transmission is or can be operatively connected to the further transmission input shaft 3. Preferably, the input shaft EW2 of the second partial transmission is operatively connected, in particular rotationally engaged with, the transmission input shaft 1 or formed thereof. The joint output shaft AW is preferably operatively connected to the transmission output shaft 2. The input shaft EW1 of the first partial transmission and the further transmission input shaft 3 are preferably hollow shafts. The input shaft EW2 of the second partial transmission and the further transmission input shaft 1 are preferably solid shafts. The input shafts EW1, EW2 of the two partial transmissions are preferably coaxial to the joint output shaft AW and/or the input shaft EW1 of the first partial transmission is concentric to the input shaft EW2 of the second partial transmission.

The fourth shaft 4 is preferably assigned to the first partial transmission and the further fourth shaft 4' to the second partial transmission. The first gear plane R1 preferably forms a drive constant for the first partial transmission and the second gear plane R2 forms a drive constant for the second partial transmission. The first gear plane R1 and the second gear plane R2 are preferably each provided with two intermeshing fixed gears 11, 11' and 12, 12' which, for instance, each form a spur gear. Preferably, one of the fixed gears 11, 11' of the first gear plane R1, in particular the fixed gear 11', is rotationally engaged with the fourth shaft 4 and the other fixed gear 11 is rotationally engaged with the input shaft EW1 of the first partial transmission. Preferably, one of the fixed gears 12, 12' of the second gear plane R2, in particular the fixed gear 12', is rotationally engaged with the further fourth shaft 4' and the other fixed gear 12 is rotationally engaged with the input shaft EW2 of the second partial transmission.

Preferably, the third gear plane R3, the fourth gear plane R4, the fifth gear plane R5 and the sixth gear plane R6 each comprise a shiftable gearset, for instance a spur gear. For this purpose, the third gear plane R3, the fourth gear plane R4, the fifth gear plane R5 and the sixth gear plane R6 have at least one fixed gear 13' or 14' or 15' or 16', in particular a spur gear, and an assigned idler gear 13 or 14 or 15 or 16, in particular a counter spur gear. The relevant fixed gear 13' or 14' is assigned to the further fourth shaft 4', in particular rotationally engaged with the further fourth shaft 4', and the relevant fixed gear 15' or 16' is assigned to the fourth shaft 4, in particular rotationally engaged with the fourth shaft 4.

Furthermore, the manual transmission 100 has a plurality of shift elements, in particular associated to the main transmission HG, preferably a first shift element 10, a second shift element 20, a third shift element 30, a fourth shift element 40, a fifth shift element 50, a sixth shift element 60 and a seventh shift element 70, whose selective shifting results in different gear ratios between the transmission input shaft 1 and the transmission output shaft 2 and/or between the further transmission input shaft 3 and the transmission output shaft 2. The gear wheel sets of the third gear plane R3 the fourth gear plane R4, the fifth gear plane R5 and the sixth gear plane R6, for instance, can be selectively shifted by means of at least individual shift elements of the shift elements 10, 20, 30, 40, 50, 60, 70. Preferably, the second shift element 20 is provided to couple the transmission output shaft 2 to, in particular rotationally engage with, the transmission input shaft 1, in particular bypassing the gear planes R1, R2, R3, R4, R5, resulting in the manual transmission 100 being in a direct gear with respect to the main transmission HG. Preferably, the first shift element 10 is provided to interconnect the two partial transmissions, in particular to rotationally engage the input shaft EW1 of the first partial transmission with the input shaft EW2 of the second partial transmission.

Furthermore, the manual transmission 100 has a range group GP that can be or is coupled to the main transmission HG, in particular downstream of the main transmission HG, having at least one planetary gearset PS, which has a first gear element 1.1, a second gear element 1.2 and a third gear element 1.3. Preferably, the first gear element 1.1 is a sun gear, the second gear element 1.2 is a planetary gear carrier, in particular a web, and the third gear element 1.3 is a ring gear.

A shifting device SE1 is assigned to the range group GP, by means of which the range group GP can optionally be shifted to a first gear ratio or to a second gear ratio. In the first gear ratio, the gears that can be shifted using the main transmission HG are assigned to a slow gear group. In the second gear ratio, the gears that can be shifted using the main transmission HG are assigned to a fast gear group. The first gear ratio and the second gear ratio are preferably achieved by the third gear element 1.3 of the planetary gearset PS being selectively retained against a component attached to the housing G by means of the shifting device SE1 (first gear ratio) or being blocked against the second gear element 1.2 of the planetary gearset PS (second gear ratio). Preferably, the component attached to the housing G is a component attached to the housing of the manual transmission 100 component or an integral part of the housing itself.

Preferably, the shifting device SE1 has at least two shift elements as additional shift elements L, S of the manual transmission 100, of which a first additional shift element L for is used to retain the third gear element 1.3 of the planetary gearset PS against the component attached to the housing G and a second additional shift element S is used to block the third gear element 1.3 of the planetary gearset PS against the second gear element 1.2. The additional shift elements L and S can be combined into a double shift element. Preferably, the shifting device SE1 also has a neutral position, in particular an open position, in which the third gear element 1.3 of the planetary gearset PS is decoupled from the component G attached to the housing and is present without blocking.

Preferably, the first gear element 1.1 of the planetary gearset PS of the range group GP is operatively connected to, in particular rotationally engaged with, a fifth shaft 5. Preferably, the fifth shaft 5 is operatively connected to, in particular rotationally engaged with, the joint output shaft AW of the two partial transmissions or formed by the output shaft AW. Preferably, the second gear element 1.2 of the planetary gearset PS of the range group GP is operatively connected to, in particular rotationally engaged with, the transmission output shaft 2. Preferably, the second gear element 1.2 of the planetary gearset PS of the range group GP can be additionally operatively connected to, in particular rotationally engaged with, the sixth gear plane R6 by means of one of the shift elements 10, 20, 30, 40, 50, 60, 70.

In the case of the manual transmission 100, a preliminary gear stage V for the electric machine EM and a further shifting device SE2 may be provided, by means of which the preliminary gear stage V can be selectively shifted into a superposition mode or a transmission mode. Preferably, the electric machine EM, the preliminary gear stage V and the further shifting device SE2 are combined in an electric machine group EMG.

In the superposition mode, the transmission input shaft 1 and the further transmission input shaft 3 act on the input shaft EW1 of the first partial transmission in terms of rotational speed, Thus in superposition mode, in addition to the operative connection of the electric machine EM to the input shaft EW1 of the first partial transmission, additionally an operative connection is established from the transmission input shaft 1 to the input shaft EW1 of the first partial transmission, via which a prime mover connected to the transmission input shaft 1, such as an internal combustion engine, can act. In this mode of operation, for instance, a motor vehicle can be driven away electrodynamically (electrodynamic driving away, EDA). In this mode of operation, shifting can be done electrodynamically as well (electrodynamic shifting, EDS).

In transmission mode, the further transmission input shaft 3 acts on the input shaft EW1 of the first partial transmission, and the transmission input shaft 1 is drive-decoupled from the preliminary gear stage V. Thus, in the transmission mode of the preliminary gear stage V only an operative connection of the electric machine EM to the input shaft EW1 of the first partial transmission is established. In this mode of operation, the preliminary gear stage V acts as a constant gear ratio between the further transmission input shaft 3 and the input shaft EW1 of the first partial transmission.

Preferably, the further shifting device SE2 may comprise at least two shift elements as additional shift elements I, J of the manual transmission 100, of which a third additional shift element I is used to shift the preliminary gear stage V into superposition mode and a fourth additional shift element J is used to shift the preliminary gear into transmission mode. The additional shift elements I and J can be combined into a double shift element. Preferably, the further shifting device SE2 also has a neutral position, in particular an open position, in which the preliminary gear stage V is brought out of the superposition mode and the transmission mode and the input shaft EW1 of the first partial transmission is decoupled from the transmission input shaft 1 and the electric machine EM in terms of drive.

Preferably, the preliminary gear stage V comprises a planetary gear assembly or is formed therefrom and has a first gear element 2.1, a second gear element 2.2 and a third gear element 2.3. Preferably, the first gear element 2.1 is operatively connected to, in particular rotationally engaged with, the further transmission input shaft 3 and the second gear element 2.2 is operatively connected to, in particular rotationally engaged with, a sixth shaft 6. Preferably, the sixth shaft 6 is operatively connected to, in particular rotationally engaged with, the input shaft EW1 of the first partial transmission, or formed by the input shaft EW1 of the first transmission. Preferably, the third gear element 2.3 can optionally be operatively connected to, in particular rotationally engaged with, the transmission input shaft 1 or a component attached to the housing G or the component attached to the housing G by means of the further shifting device SE2. Preferably, the first gear element 2.1 is a sun gear, the second gear element 2.2 is a planetary gear carrier, in particular a web, and the third gear element 2.3 is a ring gear.

Preferably, the shift elements 10, 20, 30, 40, 50, 60, 70 can be shifted as follows: The transmission input shaft 1 can be operatively connected to, in particular rotationally engaged with, the first gear plane R1 via the first shift element 10 and to the fifth shaft 5 via the second shift element 20 and/or the output shaft AW of the partial transmission in each case. The fifth shaft 5 and/or the output shaft AW of the partial transmission can be operatively connected to, in particular rotationally engaged with, the third gear plane R3 via the third shift element 30, to the fourth gear plane R4 via the fourth switching element 40 and to the fifth gear plane R5 via the fifth switching element 50 in each case.

The sixth gear plane R6 can be operatively connected to, in particular rotationally engaged with, the fifth shaft 5 and/or the output shaft AW of the partial transmission via the sixth shift element 60 and operatively connected to, in particular rotationally engaged with, the second gear element 1.2 of the planetary gearset PS of the range group GP via the seventh shift element 70.

The first shift element 10 can be used to interconnect the two partial transmissions of the main transmission HG. In this respect, the internal combustion engine can in that way use the gears provided by the first partial transmission. Conversely, the electric drive can use the gears provided by the second partial transmission.

Due to the second shift element 20, the transmission input shaft 1 and the input shaft EW2 of the second partial transmission and the output shaft AW of the second partial transmission can be coupled directly, such that there is a direct gear in the coupled state.

Preferably, the second shift element 20 and the third shift element 30 are combined in a double shift element. Preferably, the fifth shift element 50 and the sixth shift element 60 are combined into a double shift element. Preferably, the first shift element 10 and the seventh shift element 70 are each a single shift element.

The manual transmission 100 can be operated solely based on the implementable gear stages of the main transmission HG as a 5-speed transmission. The range group GP can be used to achieve a doubling of the gear ratios of the main transmission HG by selectively shifting the range group GP to the first gear ratio by means of the shifting device SE1 and thus permitting the gears of the main transmission HG to be shifted in the slow gear group or to the second gear ratio and thus permitting the gears of the main transmission HG to be shifted in the fast gear group. In order to be able to use the electric machine EM via the input shaft EW1 of the first partial transmission, the preliminary ratio V is additionally to be shifted into transmission mode or into superposition mode by means of the further shifting device SE2. In the manual transmission 100 gear changes can be performed, which can be fully shifted under load.

In the case of the manual transmission 100, in principle it is possible to provide a separating clutch or drive-away clutch for a prime mover that can be connected to the transmission input shaft 1, such as, for instance, an internal combustion engine. At least one mechanical reverse gear may be provided. The reverse gear can be implemented by an additional spur gear plane using an additional shift element. Alternatively, the reverse gear can be implemented as a planetary reversing set having two additional shift elements, of which one shift element is used for driving forward and another shift element is used for driving in reverse. Alternatively, a so-called PGR range group may be provided. Such a range group is integrated with an R-gear.

Figure 2:
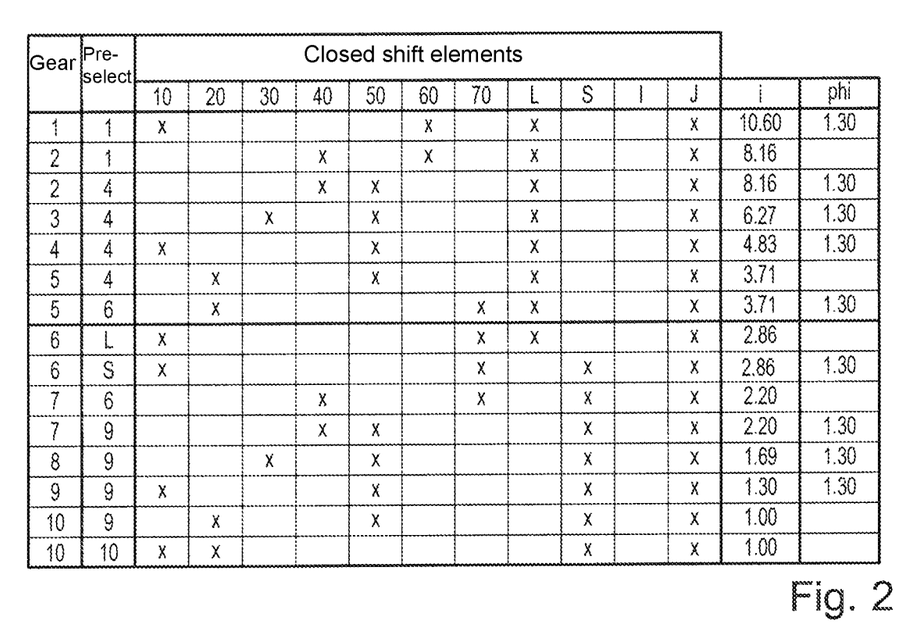
FIG. 2 shows a tabular overview of possible gears in a slow gear group, which can be shifted by means of the manual transmission according to FIG. 1, and the shift elements to be actuated for that purpose.

FIG. 2 shows a tabular overview of possible gears, which—starting from the transmission input shaft 1—can be shifted using the manual transmission 100 and the shifting combinations to be executed with respect to the first shift element 10, the second shift element 20, the third shift element 30, the fourth shift element 40, the fifth shift element 50, the sixth shift element 60, the seventh shift element 70, the first additional shift element L, the second additional shift element S, the third additional shift element I and the fourth additional shift element J. The shift matrix according to FIG. 2 refers to a variant in which the manual transmission 100 is used as a 10-speed transmission. In this respect, ten selectively shiftable gears are implemented, which relate to a flow of power starting from the transmission input shaft 1. FIG. 2 further relates to the ISG mode of the manual transmission 100. In this mode, the preliminary gear stage V is in transmission mode. To this end, the fourth additional shift element J is consistently closed and preferably the third additional shift element I is opened.

The gears or gear ratios are indicated in the first column of the overview. The gears are labeled "1", "2", "3", "4", "5", "6", "7", "8", "9", "10". In adjoining columns, the position of the shift elements 10, 20, 30, 40, 50, 60, 70, 80, L, S, I, J are indicated, wherein crosses indicate that the respective shift elements 10 or 20 or 30, 40, 50, 60, 70, 80, L, S, I, J, respectively, are in a closed shift position. If no cross is indicated, the corresponding shift element 10 or 20 or 30 or 40 or 50 or 60 or 70 or 80 or L or S or I or J may be open.

In the tabular overview of FIG. 2, one further column is provided, which is designated "preselection". There the preselected gears are listed. These preselected gears can be shifted when the gear indicated in the first column is achieved, as the at least one shift element of the preselection gear to be shifted in addition is located in the partial transmission, which is load-free in the achieved gear. As a result, the shifting times for a gear change can be reduced.

At the same time, the preselection gears are to be shifted in order to provide a flow of power also starting from the electric machine EM in the affected gear of the manual transmission 100 in accordance with the first column of FIG. 2. In this respect, for instance, two $2^{nd}$ gears can be shifted, which do not differ with respect to the path of the flow of power via the transmission input shaft 1, but for which different shift elements are additionally shifted to also couple the electric machine EM into or out of the path of the flow of power.

In addition, exemplary values of a possible design of the manual transmission 100 with regard to the ratios and the transmission increments or gear increments are indicated in FIG. 2. For every gear the provided ratio I is indicated. Gear increments or transmission increments, which are designated as "phi", relate to the gear increment of the respective specified gears to the next higher gears, wherein the value for the gear increments is indicated in each case in the line of the lower gear.

As can be seen from FIG. 2, a $1^{st}$ gear is achieved by closing the first shift element 10, the sixth shift element 60 and the first additional shift element L. A $2^{nd}$ gear is achieved by closing the fourth shift element 40 and the first additional shift element L. A $3^{rd}$ gear is achieved by closing the third shift element 30 and the first additional shift element L. A $4^{th}$ gear is achieved by closing the first shift element 10, the fifth shift element 50 and the first additional shift element L. A $5^{th}$ gear is achieved by closing the second shift element 20 and the first additional shift element L. A $6^{th}$ gear is achieved by closing the first shift element 10 and the seventh shift element 70. A $7^{th}$ gear is achieved by closing the fourth shift element 40 and the second additional shift element S. An $8^{th}$ gear is achieved by closing the third shift element 30 and the second additional shift element S. A $9^{th}$ gear is achieved by closing the first shift element 10, the fifth shift element 50 and the second additional shift element S. A $10^{th}$ gear is achieved by closing the second shift element 20 and the second additional shift element S. Preferably, the third additional shift element I is open in all ten gears or is shifted to the open position or neutral position. Preferably, the fourth additional shift element J is closed in all ten gears or is shifted to the closed position.

Starting from the transmission input shaft 1, a path of the flow of power to the transmission output shaft 2 is established in the gears one to ten. In order to establish a path of the flow of power from the further transmission input shaft 3 to the transmission output shaft 2 in all of these gears, provision is made that in $2^{nd}$ gear the fifth shift element 50 (preselection: $4^{th}$ gear) or the sixth shift element 60 (preselection: $4^{th}$ gear) is additionally closed, in $3^{rd}$ gear the fifth shift element 50 (preselection: $4^{th}$ gear) is additionally closed, in $5^{th}$ gear the fifth shift element 50 (preselection: $4^{th}$ gear) or the seventh shift element 70 (preselection: $6^{th}$ gear) is additionally closed, in $7^{th}$ gear the fifth shift element 50 (preselection: $9^{th}$ gear) or the seventh shift element 70 (preselection: $6^{th}$ gear) is additionally closed, in $8^{th}$ gear the fifth shift element 50 (preselection: $9^{th}$ gear) is additionally closed and/or in $10^{th}$ gear the first shift element 10 (preselection: $10^{th}$ gear) or the fifth shift element 50 (preselection: $9^{th}$ gear) is additionally closed.

In 6th gear the first additional shift element L and the second additional shift element S are each load-free, as the flow of power is routed directly to the second transmission element 1.2 of the planetary gearset PS of the range group GP via the seventh shift element 70. In this respect, in 6th gear either the first additional shift element L or the second additional shift element S can remain closed or a shift of the range group can be performed, i.e. either the first additional shift element L is closed and the second additional shift element S is open or first additional shift element L is open and the second additional shift element S is closed.

Figure 3:
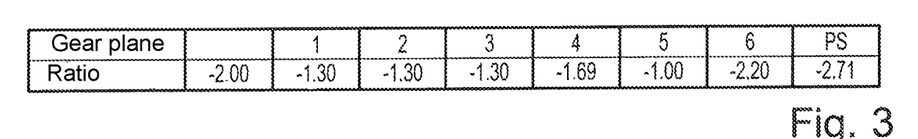
FIG. 3 shows a possible gear ratio series for the gear planes of the manual transmission according to FIG. 1

FIG. 3 shows, by way of example, a possible gear ratio series for the gear planes R1, R2, R3, R4, R5, R6, the gear plane formed by the planetary gearset PS and the gear plane formed by the preliminary gear stage V. For the planetary gearset PS, the specified ratio is the stationary gear ratio. The same applies to the preliminary gear stage V, if the preliminary gear stage V is formed by a planetary gear assembly. With regard to the gear planes R1, R2, R3, R4, R5, R5, the specified gear ratio corresponds to the respective teeth number ratio of the spur gears. The negative sign refers to a reversal of the direction of rotation. The gear ratios of the gear planes R1 and R2 are indicated in the flow of power direction from the transmission input shaft 1 and the further transmission input shaft 3 towards the fourth shaft 4 or the further fourth shaft 4'. The gear ratios relating to the third gear plane R3, the fourth gear plane R4, the fifth gear plane R5 and the sixth gear plane R6 are indicated in the flow of power direction as from the fourth shaft 4 and the further fourth shaft 4' to the fifth shaft 5 and output shaft AW, respectively.

Figure 4:
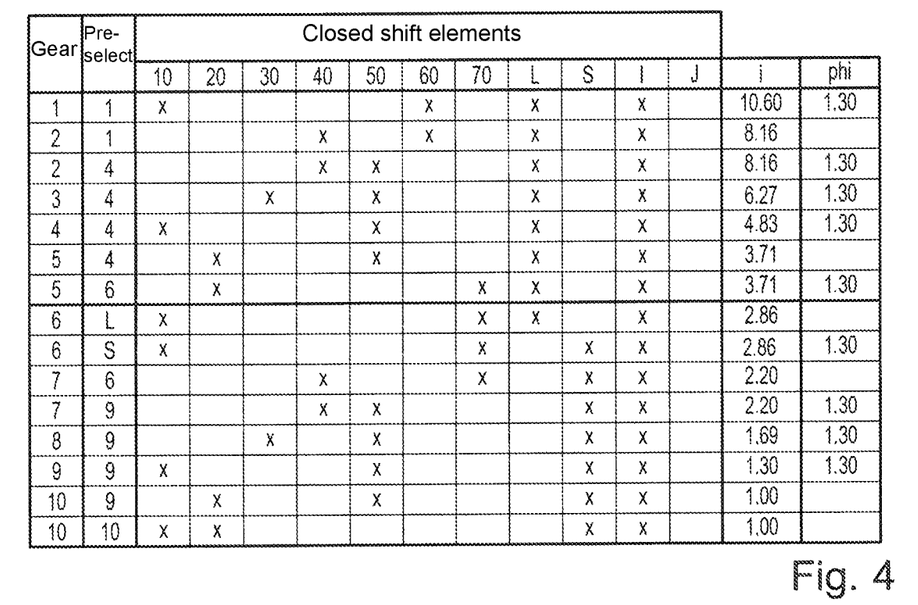
FIG. 4 shows a tabular overview of possible gears in a fast gear group, which can be shifted by means of the manual transmission according to FIG. 1, and the shift elements to be actuated for that purpose.

FIG. 4 shows a tabular overview of possible gears which, starting from the transmission input shaft 1, can be shifted using the manual transmission 100 and the shift combinations to be executed to that end with respect to the shift elements 10, 20, 30, 40, 50, 60, 70 and the additional shift elements L, S, I, J. In contrast to FIG. 2, FIG. 4 relates to the EDA mode of the manual transmission 100. In this mode, the preliminary gear stage V is in superposition mode. To this end, the third additional shift element I is consistently closed and preferably the fourth additional shift element J is open. Otherwise, the shift matrix of FIG. 4 is identical to the shift matrix according to FIG. 2, i.e. reference is made to the description of FIG. 2.

The manual transmission 100 according to FIG. 1 has a multiplicity of properties and/or functions, some of which are explained below: By coupling the two partial transmissions by means of the first shift element 10, an internal combustion engine connected to the transmission input shaft 1 can use the gears of the first partial transmission, which is assigned to the electric machine EM. The same applies in the reverse manner, namely that the electric machine EM can use the gears of the second partial transmission, which is assigned to the internal combustion engine or the transmission input shaft 1.

In addition, by means of the first shift element 10, the internal combustion engine or transmission input shaft 1 can be connected to the electric machine EM, without shifting a gear to the transmission output shaft 2. As a result, the internal combustion engine can be started using the electric machine EM or electric current can be generated in the neutral position of the first shift element 10, i.e. independent of the driving speed and thus also when the vehicle is at a standstill. In this case, the internal combustion engine drives the electric machine EM, which then operates as a generator.

With respect to the main transmission HG, a purely electric driving using those two gears, which are assigned to the sixth shaft 6 and to the input shaft EW1 of the first partial transmission is possible. Furthermore, a driving in reverse is possible, which can be effected by a reversal of the direction of rotation of the electric machine EM. Using the area group GP, four electrical gears result.

The main transmission HG further renders possible that for a purely electric driving, a clutch for the internal combustion engine is not required because the transmission input shaft 1 by opening the first shift element 10, the second shift element 20, the third shift element 30 and the fourth shift element 40 is decoupled. Due to the two partial transmissions, the internal combustion engine and the electric machine EM can be operated using different gear ratios. Suitable operating points can be selected for the internal combustion engine and the electric machine EM, depending on the driving situation, in each case. The electric machine EM can at times also be completely disconnected and stand still, in this way zero load losses are avoided.

It is possible that in a hybrid drive having the transmission 100, in ISG mode uninterrupted load shifts can be performed. For instance, the electric machine EM supports the tractive force via the sixth shaft 6 or the input shaft EW1 of the first partial transmission in all gear changes, which are assigned to the transmission input shaft 1. For instance, the internal combustion engine supports the tractive force via the transmission input shaft 1 in all gear changes, which are assigned to the sixth shaft 6 and the input shaft EW1 of the first partial transmission.

Furthermore, by means of the manual transmission 100, a hybrid drive can be operated such that the shifting of the range group GP of the manual transmission 100 from the slow gear group to the fast gear group or vice versa can be performed with force support or without an interruption of traction when the hybrid drive is in purely internal combustion engine mode or in hybrid mode. Such a shifting of the range group GP without interruption of the traction force can be performed in the ISG mode of the manual transmission 100 and in the EDA mode of the manual transmission 100. This process is based on the direct gear, for instance, the direct gear in the slow gear group, in which the second shift element 20 and the first additional shift element L are closed. The electric machine EM acts on the basis of the prehistory ($4^{th}$ gear) still in $4^{th}$ gear, in which the fifth shift element 50 is closed. This starting situation is shown in FIG. 2 and the row with respect to the 5th gear with preselection of the $4^{th}$ gear. For shifting the area group GP in the course of shifting without an interruption of traction from $5^{th}$ gear to $6^{th}$ gear, for instance, the procedure is as follows:

1. Load reduction at the electric machine EM, if load is present (load transfer to the internal combustion engine);
2. Load-free opening of the fifth shift element 50;
3. Active synchronization of the seventh shift element 70 by reducing the speed of the electric machine EM by means of speed control of the electric machine EM;
4. Load-free closing of the seventh shift element 70 (cf. shift matrix according to $5^{th}$ gear with preselection of the $6^{th}$ gear). In this way, the correct subsequent gear ($6^{th}$ gear) is preselected;
5. Load transfer from the internal combustion engine to the electric machine EM, i.e. the electric machine EM supports the traction in the target gear ($6^{th}$ gear);
6. Opening of the second shift element 20 after the internal combustion engine has become free of load;
7. Optional: Change from L to S (synchronization based on synchronized additional shift element S) while the second shift element 20 is open. Change from L to S at this point is advantageous, but not necessary. The change can also be performed outside of the shifting from $5^{th}$ gear into $6^{th}$ gear at a later point in time, such as indicated in the shift matrix for the $6^{th}$ gear with preselection L beyond the $6^{th}$ gear with preselection S. The additional shift element L would then remain closed for the time being according to the shift matrix for the fifth gear with preselection L;
8. Immediately after the second shift element 20 has been opened or starting with step 7, if step 7 is executed, the internal combustion engine is synchronized to speed, i.e. the first shift element 10 is synchronized with the internal combustion engine
9. Load-free closing of the first shift element 10. A $6^{th}$ gear is engaged and shifting is completed. In the shift matrix according to FIG. 2, $6^{th}$ gear with preselection L or preselection S is achieved;
10. Load transfer from the electric machine EM to the internal combustion engine depending on the operating strategy.

Similarly, a shifting of the area group GP without interruption of the traction force in the course of shifting from $5^{th}$ gear into $6^{th}$ gear can be performed when the transmission 100 is in EDA mode. Shifting can be performed as follows;
1. Load reduction at the electric machine EM, if bad is present, by bad transfer to the internal combustion engine;
2. Load-free opening of the fifth shift element 50;
3. Active synchronization of the seventh shift element 70 by means of speed control of the electric machine EM. For this purpose, the speed at the second transmission element 2.2 (web) of the preliminary gear stage V is reduced. This is done by reducing the speed of the electric machine EM according to the Willis equation for the planetary gear assembly forming the preliminary gear stage. Instead of reducing the speed, the direction of rotation of the electric machine EM can also be reversed;
4. Load-free closing of the seventh shift element 70. Now the correct subsequent gear ($6^{th}$ gear) is preselected;
5. The torques of the internal combustion engine and the electric machine EM are set in such a way that they represent the preliminary gear stage V in relation to the stationary gear ratio of the planetary gear assembly, and thus the second shift to be designed element 20 is free of bad. The flow of power then runs exclusively via the second transmission element 2.2 (web) of the planetary gear assembly and the seventh shift dement 70. At the same time, the torques of the internal combustion engine and of the electric machine EM are set within the limits of the two machines such that the traction matches the setpoint desired by the driver or the driving strategy function as closely as possible.
6. Opening of the second shift element 20 after it has become free of load;
7. Optional: Change from L to S (synchronization based on synchronized additional shift element S) while the second shift element 20 is open, by closing the additional shift element S and opening the additional shift element L. The change from L to S at this point is advantageous, but not necessarily required. The change can also be performed outside of the shifting from $5^{th}$ gear into $6^{th}$ gear at a later point in time. The additional shift element L would then remain closed for the time being;
8. Immediately after the second shift element 20 has been opened, i.e. simultaneously with step 7, the torques of the internal combustion engine and the electric machine EM are controlled such that the rotational speed of the internal combustion engine decreases to target speed and thus the first shift element 10 is synchronized;
9. Load-free closing of the first shift element 10. A $6^{th}$ gear is engaged and shifting is completed;
10. Load transfer from the electric machine EM to the internal combustion engine depending on the operating strategy.

In the transmission 100 shown, only one half of each of the transmission elements arranged coaxially with respect to the transmission input shaft 1 are shown for the sake of simplicity.

REFERENCE NUMERALS 1 transmission input shaft (first shaft)
2 transmission output shaft (second shaft)
3 further transmission input shaft (third shaft)
4 fourth shaft
4' further fourth shaft
5 fifth shaft
6 sixth shaft
EW1 input shaft
EW2 input shaft
AW output shaft
HG main transmission
GP range group
EMG electric machine group
EM electric machine
R rotor
S stator
V preliminary gear stage
PS planetary gearset
G housing, component attached to the housing
1.1 first transmission element
1.2 second transmission element
1.3 third transmission element
2.1 first transmission element
2.2 second transmission element
2.3 third transmission element
R1 first gear plane
R2 second gear plane
R3 third gear plane
R4 fourth gear plane
R5 fifth gear plane
R6 sixth gear plane
11 fixed gear
12 fixed gear
13 idler gear
14 idler gear
15 idler gear
16 idler gear
11' fixed gear
12' fixed gear
13' fixed gear
14' fixed gear
15' fixed gear
16' fixed gear
10 first shift element
20 second shift element
30 third shift element
40 fourth shift element
50 fifth shift element
60 sixth shift element
70 seventh shift element
SE1 shifting device
L first additional shift element
S second additional shift element
SE2 further shifting device
I third additional shift element
J fourth additional shift element
100 manual transmission

The invention claimed is:

1. An automated manual transmission for a hybrid drive of a motor vehicle, the automated manual transmission comprising:
a transmission input shaft as a first shaft, a transmission output shaft as a second shaft, a further transmission input shaft as a third shaft;
an electric machine being drive-connected to the further transmission input shaft;
a main transmission comprising at least first and second partial transmissions, the first partial transmission having at least a first fourth shaft and at least one gear plane coupled thereto, the second partial transmission having at least one further fourth shaft and at least one gear plane coupled thereto, and the first fourth shaft and the further fourth shaft being arranged at least one of concentrically and coaxially to each other;
a plurality of shift elements being arranged in the main transmission and selective shifting of the shift elements resulting in different gear ratios at least one of between the transmission input shaft and the transmission output shaft, and between the further transmission input shaft and the transmission output shaft;
a range group being couplable to the main transmission, the range group comprising at least one planetary gearset which has a first transmission element, a second transmission element and a third transmission element;
the first transmission element being operatively connected to at least one of the transmission input shaft and the further transmission input shaft (3) by at least one of the shift elements;
the second transmission element being operatively connected to at least one of the transmission input shaft and the further transmission input shaft by at least one of the shift elements, and the second transmission element being disengageable from all of the gear planes of the first and the second partial transmissions, and the second transmission element being operatively connected to the transmission output shaft;
the third transmission element, by a shifting device, being either selectively:
retained by a first component attached to a housing, or
coupled to the second transmission element.

2. The automated manual transmission according to claim 1, wherein the shifting device has at least one shift element which is an additional shift element of the automated manual transmission, which is shiftable into at least first and second shifting positions, in the first shifting position, the third transmission element of the planetary gearset is fixed to the first component attached to the housing and, in the second shifting position, the third transmission element of the planetary gearset is coupled to the second transmission element.

3. The automated manual transmission according to claim 1, wherein the shifting device has at least first and second additional shift elements of the automated manual transmission, the first additional shift element is used to retain the third gear element of the planetary gearset against the first component attached to the housing and the second additional shift element is used to couple the third gear element of the planetary gearset to the second transmission element.

4. The automated manual transmission according to claim 3, wherein the first additional shift element and the second additional shift element are combined with one another into a double shift element.

5. The automated manual transmission according to claim 1, wherein the shifting device has a neutral position in which the third transmission element of the planetary gearset is decoupled from the first component attached to the housing and is decoupled from the first transmission element and the second transmission element.

6. The automated manual transmission according to claim 1, wherein the main transmission has at least first and second drive constants, the first drive constant is formed by a first gear plane of the at least one gear plane of the first partial transmission and the second drive constant is formed by a second gear plane of the at least one gear plane of the second partial transmission.

7. The automated manual transmission according to claim 1, wherein the gear planes of the at least one gear plane of the first and the second partial transmissions of the main transmission comprises a first gear plane, a second gear plane, a third gear plane, a fourth gear plane, a fifth gear plane and a sixth gear plane;
the first partial transmission comprises the first gear plane, the fifth gear plane and the sixth gear plane, and the second partial transmission comprising the second gear plane, the third gear plane and the fourth gear plane;
the first gear plane is operatively connected to the further transmission input shaft and forms a drive constant, and the second gear plane is operatively connected to the transmission input shaft and forms another drive constant;
the third gear plane, the fourth gear plane, the fifth gear plane and the sixth gear plane each have at least one fixed gear and an associated loose gear, the fixed gears of the fifth gear plane and the sixth gear plane are fixed to the first fourth shaft, and the fixed gears of the third gear plane and the fourth gear plane are fixed to the further fourth shaft.

8. The automated manual transmission according to claim 7, wherein the plurality of shift elements of the automated manual transmission comprises first, second, third, forth, fifth, sixth and seventh shift elements, and the transmission input shaft is operatively connectable, via the first shift element, to the first gear plane and, via the second shift element, to a fifth shaft,
the fifth shaft is operatively connected to the first transmission element of the planetary gear stage, and the fifth shaft is operatively connectable, via the third shift element, to the third gear plane, and, via the fourth shift element, to the fourth gear plane, and, via the fifth shift element, to the fifth gear plane, and
the sixth gear plane is operatively connectable, via the sixth shift element, to the fifth shaft, and the sixth gear plane is disengageably connectable, via the seventh shift element, to the second transmission element of the planetary gearset.

9. The automated manual transmission according to claim 8, wherein with respect to the transmission input shaft, first, second, third, fourth, fifth, sixth, seventh, eighth, ninth and tenth gears are selectively attainable;
the first shift element and the sixth shift element are engaged for the first gear;
the fourth shift element is engaged for the second gear;
the third shift element is engaged for the third gear;
the first shift element and the fifth shift element are engaged for the fourth gear;
the second shift element is engaged for the fifth gear;
the first shift element and the seventh shift are engaged for the sixth gear;
the fourth shift element is engaged for the seventh gear;
the third shift element is engaged for the eighth gear;

the first shift element and the fifth shift element are engaged for the ninth gear;

the second shift element is engaged for the tenth gear;

the third transmission element of the planetary gearset is fixed, via the shifting device, to the first component attached to the housing in each of the first, the second, the third, the fourth and the fifth gears; and the third transmission element of the planetary gearset is coupled, via the shifting device, to the second transmission element of the planetary gearset in each of the seventh, the eighth, the ninth and the tenth gears.

10. The automated manual transmission according to claim 9, wherein either the fifth shift element or the sixth shift element is also engaged in second gear;

the fifth shift element is also engaged in the third gear;

either the fifth shift element or the seventh shift element is also engaged in the fifth gear;

in the sixth gear, the third transmission element of the planetary gearset is either fixed to the first component attached to the housing or is coupled to the second transmission element of the planetary gearset by the shifting device;

either the fifth shift element or the seventh shift element is also engaged in the seventh gear;

the fifth shift element is also engaged in the eighth gear; and either the first shift element or the fifth shift element is engaged in the tenth gear.

11. The automated manual transmission according to claim 1, further comprising a preliminary gear stage for the electric machine and a further shifting device, the preliminary gear stage being selectively shifted, via the further shifting device, into either a superposition mode or a transmission mode;

in the superposition mode of the preliminary gear stage, the transmission input shaft and the further transmission input shaft act on the first partial transmission in terms of rotational speed; and in transmission mode of the preliminary gear stage, the further transmission input shaft acts on the first partial transmission and the transmission input shaft is decoupled from the preliminary gear stage.

12. The automated manual transmission according to claim 11, wherein the further shifting device has at least one shift element which is an additional shift element of the automated manual transmission, which is shiftable into at least first and second shifting positions, in the first shifting position, the preliminary gear stage is shifted into the superposition mode and in the second shifting position, the preliminary gear stage is shifted into the transmission mode.

13. The automated manual transmission according to claim 11, wherein the further shifting device has at least first and second further shift elements of the automated manual transmission, the first further shift element shifts the preliminary gear stage into the superposition mode and the second further shift element is used to shift the preliminary gear stage into the transmission mode.

14. The automated manual transmission according to claim 11, wherein the further shifting device has a neutral position in which the preliminary gear stage is brought out of the superposition mode and the transmission mode and the first partial transmission is drive-decoupled from the transmission input shaft and the electric machine.

15. The automated manual transmission according to claim 11, wherein the preliminary gear stage is formed by a planetary gear assembly having a first transmission element, a second transmission element and a third transmission element, the first transmission element of the planetary gear assembly is operatively connected to the further transmission input shaft, the second transmission element of the planetary gear assembly is operatively connected to the first partial transmission, and the third transmission element of the planetary gear assembly is operatively connectable, by the further shifting device, to either the transmission input shaft or another component attached to the housing.

16. The automated manual transmission according to claim 15, wherein the first transmission element of the planetary gear assembly of the preliminary gear stage is a sun gear, the second transmission element of the planetary gear assembly of the preliminary gear stage is a planetary gear carrier, and the third transmission element of the planetary gear assembly of the preliminary gear stage is a ring gear.

17. The automated manual transmission according to claim 1, wherein the first transmission element of the planetary gearset of the range group is a sun gear, the second transmission element of the planetary gearset of the range group is a planetary gear carrier, and the third transmission element of the planetary gearset of the range group is a ring gear.

18. A hybrid drive for a commercial vehicle, having either an internal combustion engine or any other drive and an automated manual transmission according to claim 1, the transmission input shaft of which can be drive-connected to the internal combustion engine for performing a method including shifting the range group between the first gear ratio and the second gear ratio in either a pure combustion engine operation or a hybrid operation of the hybrid drive in a traction-force-controlled manner by shifting the automated manual transmission in a direct gear of the main transmission and in the first gear ratio of the range group and the electric machine is either drive-connected or shifted in a path of a flow of power of the direct gear; in the direct gear, operatively connecting the transmission input shaft and the further transmission input shaft to the first transmission element of the range group; separating the electric machine from the operative connection to the first transmission element of the range group by at least one of the shift elements; operatively connecting the electric machine to the second transmission element of the range group via the first partial transmission by at least one of the shift elements; separating the transmission input shaft from the operative connection to the first transmission element of the range group by at least one of the shift elements (10, 20, 30, 40, 50, 60, 70); and shifting the range group into the second gear ratio by means of the shifting device.

19. A method of operating a hybrid drive of a motor vehicle having either an internal combustion engine or other drive and an automated manual transmission comprising a transmission input shaft as a first shaft, a transmission output shaft as a second shaft, a further transmission input shaft as a third shaft, the transmission input shaft being drive-connectable to the internal combustion engine, and the transmission output shaft providing a tractive force to the motor vehicle; an electric machine which is drive-connected to the further transmission input shaft; a main transmission comprising at least first and second partial transmissions, the first partial transmission has at least a first fourth shaft and at least one gear plane coupled to the first fourth shaft, the second partial transmission has at least one further fourth shaft and at least one gear plane coupled to the further fourth shaft, the first fourth shaft (4) and the further fourth shaft being arranged at least one of concentrically and coaxially to one another; a plurality of shift elements being arranged in the main transmission, selective shifting of the shift elements resulting in different gear ratios at least one of between the transmission input shaft and the transmission output shaft, and between the further transmission input shaft and the transmission output shaft; a range group being couplable to the main transmission, the range group comprising at least one planetary gearset which has a first transmission element, a second transmission element and a third transmission element; the first transmission element being operatively connected to at least one of the transmission input shaft and the further transmission input shaft by at least one of the shift elements; the second transmission element being operatively connected to at least one of the transmission input shaft and the further transmission input shaft by at least one of the shift elements, and the second transmission element being operatively connected to the transmission output shaft and disengageably couplable to one of the at least one gear planes of the first and the second partial transmissions; the third transmission element, by a shifting device, being selectively either retained by a first component attached to a housing or coupled to the second transmission element; when the third transmission element is retained by a first component attached to a housing, the range group provides a first gear ratio, and when the third transmission element is coupled to the transmission element, the range group provides a second gear ratio, and the range group being shiftable between the first gear ratio and the second gear ratio by the shifting device, and the method comprising:

shifting the range group between the first gear ratio and the second gear ratio during either a pure combustion engine operation or a hybrid operation of the hybrid drive in a traction-force-controlled manner by shifting the automated manual transmission in a direct gear of the main transmission, in which the first transmission element rotates in unison with the transmission input shaft, and in the first gear ratio of the range group, and the electric machine is either drive-connected or shifted in a path of a flow of power of the direct gear;

in the direct gear, operatively connecting the transmission input shaft and the further transmission input shaft to the first transmission element of the range group;

subsequently performing, in order, steps of:
1) separating the electric machine from the operative connection to the first transmission element of the range group by at least one of the shift elements;
2) operatively connecting the electric machine to the second transmission element of the range group via the first partial transmission by at least one of the shift elements;
3) separating the transmission input shaft from the operative connection to the first transmission element of the range group by at least one of the shift elements; and
4) shifting the range group into the second gear ratio by the shifting device.

20. The method according to claim 19, further comprising after separating the transmission input shaft in accordance with step 3) and prior to shifting the range group in accordance with step 4), performing a step of:
3a) operatively connecting the transmission input shaft to the second transmission element of the range group, via the first partial transmission, by at least one of the shift elements.

21. The method according to claim 20, further comprising, after disconnecting the transmission input shaft in accordance with step 3) and prior to operatively connecting the transmission input shaft to the second transmission element by the at least one shift element,
synchronizing the at least one shift element against a rotational speed of an input shaft of the first partial transmission by the internal combustion engine.

22. The method according to claim 19, further comprising, prior to disconnecting the operative connection between the electric machine and the first transmission element by the at least one shift element,
operating at least one of the electric machine and the internal combustion engine such that the operative connection, between the electric machine and the first transmission element, is load-free at the at least one shift element.

23. The method according to claim 19, further comprising, after disconnecting the operative connection in accordance with step 1) and prior to the operatively connecting the electric machine to the second transmission element by the at least one shift element,
synchronizing the at least one shift element against a rotational speed of the second transmission element by the electric machine.

24. The method according to claim 19, further comprising, after operatively connecting the electric machine in accordance with step 2) and before disconnecting the operative connection between the transmission input shaft and the first transmission element by the at least one shift element,
operating at least one of the electric machine and the internal combustion engine such that the operative connection between the transmission input shaft and the first transmission element, on the at least one shift element, is load-free.

25. The method according to claim 19, wherein the automated manual transmission has a preliminary gear stage for the electric machine and a further shifting device, by which the preliminary gear stage is shiftable either into a superposition mode or a transmission mode, in the superposition mode, the transmission input shaft and the further transmission input shaft act on the first partial transmission in terms of rotational speed, and in transmission mode, the further transmission input shaft acts on the first partial transmission and the transmission input shaft is drive-decoupled from the preliminary gear stage, and
shifting the preliminary gear stage into transmission mode or in accordance with step 1) before the active connection is disconnected.

26. The method according to claim 19, wherein the automated manual transmission has a preliminary gear stage for the electric machine and a further shifting device, by which the preliminary gear stage is shiftable either into a superposition mode or a transmission mode, in the superposition mode, the transmission input shaft and the further transmission input shaft act on an input shaft of the first partial transmission in terms of rotational speed, and in the transmission mode, the further transmission input shaft acts on the input shaft of the first partial transmission and the transmission input shaft is drive-decoupled from the preliminary gear stage, and
shifting the preliminary gear stage into superposition mode or in accordance with step 1) before the active connection is disconnected.

27. The method according to claim 26, further comprising operating at least one of the electric machine and the internal combustion engine prior to disconnecting the operative connection between the electric machine and the first transmission element by the at least one shift element such that the operative connection between the electric machine and the first transmission element is load-free at the least one shift element.

28. The method according to claim 26, further comprising synchronizing the at least one shift element against the rotational speed of the second transmission element by the electric machine after disconnecting the operative connection in accordance with step 1) and prior to the operative connection of the electric machine to the second transmission element by the at least one shift element.

29. The method according to claim 26, further comprising shifting the preliminary gear stage from the superposition mode to the transmission mode after the active connection has been disconnected in accordance with step 1) and before the electric machine is connected to the second transmission element by the at least one shift element,
- subsequently synchronizing the at least one shift element against the rotational speed of the second transmission element by the electric machine; and
- then shifting the preliminary gear stage back from the transmission mode into the superposition mode.

30. The method according to claim 26, further comprising, after the effective connection of the electric machine in accordance with step 2) and before disconnecting the operative connection between the transmission input shaft and the first transmission element by the at least one shift element,
- setting each of the electric machine and the internal combustion to such a torque value that at a planetary gear assembly forming the preliminary gear stage, the stationary gear ratio is present and thus the operative connection between the transmission input shaft and the first gear element is load-free at the least one shift element.

31. The method according to claim 26, further comprising, after the disconnection of the transmission input shaft in accordance with step 3) and prior to the operative connection of the transmission input shaft to the second transmission element by the at least one shift element,
- synchronizing the at least one shift element against a rotational speed of the input shaft of the first partial transmission by setting a torque of the electric machine and a torque of the internal combustion engine to such a value that a speed of the internal combustion engine is at a target value for synchronization.

* * * * *